United States Patent
Lestage et al.

(10) Patent No.: US 11,618,421 B2
(45) Date of Patent: Apr. 4, 2023

(54) METHOD OF CONTROLLING A BRAKING DEVICE

(71) Applicant: SAFRAN LANDING SYSTEMS, Velizy Villacoublay (FR)

(72) Inventors: Jean-Baptiste Lestage, Moissy-Cramayel (FR); Emmanuel Brun, Moissy-Cramayel (FR); Tiphaine Graillat, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 444 days.

(21) Appl. No.: 16/839,621

(22) Filed: Apr. 3, 2020

(65) Prior Publication Data

US 2020/0317171 A1   Oct. 8, 2020

(30) Foreign Application Priority Data

Apr. 5, 2019 (FR) ..................................... 19 03701

(51) Int. Cl.
*G05D 1/00* (2006.01)
*B60T 8/17* (2006.01)
(Continued)

(52) U.S. Cl.
CPC .......... *B60T 8/1703* (2013.01); *B60T 13/686* (2013.01); *B64C 25/44* (2013.01); *B60T 2270/88* (2013.01)

(58) Field of Classification Search
CPC .. B60T 8/1703; B60T 13/686; B60T 2270/88; B60T 13/662; B60T 17/221; B60T 8/325; B60T 13/70; B60T 17/04; B60T 17/22; B64C 25/44; B64C 25/42; B64C 25/46; F16D 65/092; F16D 65/18;
(Continued)

(56) References Cited

U.S. PATENT DOCUMENTS

| 3,718,377 | A | * | 2/1973 | Hamed | ..................... | B60T 8/32 |
| | | | | | | 188/181 A |
| 3,720,447 | A | * | 3/1973 | Hamed | ..................... | B60T 8/32 |
| | | | | | | 303/115.3 |

(Continued)

FOREIGN PATENT DOCUMENTS

| DE | 42 27 157 A | 3/1993 |
| EP | 2 508 398 A1 | 10/2012 |

(Continued)

OTHER PUBLICATIONS

French Search Report for 1903701 dated Jan. 27, 2020.

*Primary Examiner* — Shardul D Patel
(74) *Attorney, Agent, or Firm* — Sughrue Mion, PLLC

(57) ABSTRACT

A method of controlling a braking device includes receiving a braking torque instruction, on the basis of the received braking torque instruction, setting a first braking torque set point for a first brake and a second braking torque set point for a second brake, measuring a first value of a first parameter representative of the first braking torque and modifying the first braking torque set point as a function of the first value with the aid of a first servocontrol loop, and measuring a second value of a second parameter representative of the second braking torque and modifying the second braking torque set point as a function of the second value with the aid of a second servocontrol loop.

14 Claims, 5 Drawing Sheets

(51) Int. Cl.
  *B60T 13/68*  (2006.01)
  *B64C 25/44*  (2006.01)
(58) Field of Classification Search
  CPC ........... F16D 2121/02; F16D 2127/008; F16D 2129/02; F16D 2131/02; F16H 63/3483; G01C 23/00; G05D 1/00
  USPC ............................................................ 701/3
  See application file for complete search history.

(56) References Cited

U.S. PATENT DOCUMENTS

| | | | |
|---|---|---|---|
| 5,403,072 A * | 4/1995 | Kilian | B60T 17/22 303/9.69 |
| 5,456,523 A | 10/1995 | Boehringer | |
| 2012/0271490 A1* | 10/2012 | Thibault | B60T 8/00 701/3 |
| 2018/0297563 A1* | 10/2018 | Cahill | B60T 13/741 |
| 2018/0326955 A1 | 11/2018 | Georgin et al. | |
| 2019/0232932 A1* | 8/2019 | Georgin | B60T 8/17613 |

FOREIGN PATENT DOCUMENTS

| | | | |
|---|---|---|---|
| FR | 2 691 935 A1 | 12/1993 | |
| WO | 00/69721 A1 | 11/2000 | |

\* cited by examiner

METHOD OF CONTROLLING A BRAKING DEVICE

FIELD OF THE INVENTION

The invention concerns the field of braking and more particularly a method of controlling a hydraulic braking device.

BACKGROUND OF THE INVENTION

A braking device of an aircraft classically comprises a servovalve connected to a hydraulic actuator selectively exerting a pressure on a stack of braking discs comprising at least one disc constrained to rotate with a wheel. A control unit converts a braking instruction, given by the pilot (for example via a brake pedal) or by an automatic control device, into a signal controlling a supply hydraulic pressure of the actuator. Braking generally being applied to two wheels, the device comprises two servovalves respectively dedicated to a first and a second wheel. For reasons of safety, the aircraft frequently comprises first and second hydraulic sources both connected to the servovalves. Two configurations can then be set up. In accordance with a first configuration, the servovalves are supplied by the first source and, in the event of failure of the first source, the servovalves are supplied by the second source. In accordance with a second configuration, the servovalves are supplied simultaneously by the first source and the second source. Whichever configuration is adopted, this kind of braking device does not enable guarding against failure of one or both servovalves. Thus it may be necessary to duplicate the servovalves supplying the braking actuators, which causes an increase in the weight of the braking device and its cost. Finally, the pressures delivered by servovalves subject to the same control signal may be different, from which may result an imbalance of braking between the two wheels. Such an imbalance is uncomfortable for the passengers, represents a supplementary difficulty for the pilot (trajectory control) and causes differentiated wear of the brake discs, which increases maintenance costs (the discs are generally changed on the two brakes at the same time).

OBJECT OF THE INVENTION

An object of the invention is to reduce the costs linked to a braking device whilst improving the reliability thereof.

SUMMARY OF THE INVENTION

To this effect, there is provided a method of controlling a hydraulic braking device comprising a first servovalve, a second servovalve, a third servovalve, a first brake of a first wheel comprising at least a first braking actuator and a second braking actuator for applying a first braking torque to the first wheel and a second brake of a second wheel comprising at least a third braking actuator and a fourth braking actuator for applying a second braking torque to the second wheel. The first servovalve is adapted to deliver a first pressure to the first actuator, the second servovalve is adapted to deliver a second pressure to the third actuator and the third servovalve is adapted to deliver a third pressure to the second actuator and to the fourth actuator. According to the invention, the method comprises the following steps:

receiving a braking torque instruction;

on the basis of the received braking torque instruction, setting a first braking torque set point for the first brake and a second braking torque set point for the second brake;

measuring a first value of a first parameter representative of the first braking torque;

defining a first mean supply pressure to be applied to the first brake as a function of the first value of the first parameter and of the first braking set point with the aid of a first servocontrol loop;

measuring a second value of a second parameter representative of the second braking torque;

defining a second mean supply pressure to be applied to the second brake as a function of the second value of the second parameter and of the second braking set point with the aid of a second servocontrol loop;

on the basis of the first mean supply pressure and the second mean supply pressure, defining a first pressure set point, a second pressure set point and a third pressure set point;

applying the first pressure set point to the first servovalve, the second pressure set point to the second servovalve and the third pressure set point to the third servovalve.

Thus direct control of the applied braking torque is obtained, which enables a substantially identical torque to be maintained on each of the brakes, which limits the differential wear of the stacks of discs of each brake and enables maintenance costs to be reduced and the use of the stacks of discs to be optimized. Indeed, the stacks of discs of each brake being loaded in identical manner, they are worn identically, which justifies changing all of the stacks of disc of the same aircraft in a single operation. This therefore reduces the occurrence of a situation in which one worn brake is changed and this change also requires changing another stack of discs that could still be used. Finally, precise control of the braking torque enables reduction of the constraints on the dimensions of the braking members and therefore optimization of the weight of the brakes, the structure of the landing gear and potentially the fuselage of the aircraft.

Advantageously, the method comprises the supplementary step of limiting the rate of increase of the first pressure set point and/or of the second pressure set point and/or of the third pressure set point.

Advantageously, the step of defining a first pressure set point, a second pressure set point and a third pressure set point comprises the following operations:

defining a value of the first mean supply pressure of the first brake;

defining a value of the second mean supply pressure of the first brake;

setting the value of the third pressure set point;

setting the value of the first pressure set point to a value equal to:

$$Cp1=|2*P1-Cp3|$$

where Cp1 is the value of the first pressure set point, P1 is the value of the first mean supply pressure, and Cp3 is the value of the third pressure set point;

setting the value of the second pressure set point to a value equal to:

$$Cp2=|2*P2-Cp3|$$

where Cp2 is the value of the second pressure set point, P2 is the value of the second mean supply pressure, and Cp3 is the value of the third pressure set point.

The difference between the force with which the actuators press on the same brake is reduced if the value of the third pressure set point is set to a value corresponding to the arithmetic mean of the first mean supply pressure and the second mean supply pressure.

The risk of exceeding the braking torque set point is limited the most if the value of the third pressure set point is set to a value corresponding to the lower of the first mean supply pressure and the second mean supply pressure.

The braking torque set point is reached faster if the value of the third pressure set point is set to a value corresponding to the higher of the first mean supply pressure and the second mean supply pressure.

Advantageously, following the step of defining a first pressure set point, a second pressure set point and a third pressure set point and before the step of applying the first pressure set point to the first servovalve, the second pressure set point to the second servovalve and the third pressure set point to the third servovalve, the method comprises the following supplementary steps:

comparing the value of the first pressure set point to a first high threshold;

comparing the value of the second pressure set point to a second high threshold;

if the value of the first pressure set point is greater than or equal to the first high threshold, and if the value of the second pressure set point is greater than or equal to the second high threshold:

setting the value of the first pressure set point to the first high threshold;

setting the value of the second pressure set point to the second high threshold; and setting the value of the third pressure set point to a third high threshold.

Also advantageously, following the step of defining a first pressure set point, a second pressure set point and a third pressure set point and before the step of applying the first pressure set point to the first servovalve, the second pressure set point to the second servovalve and the third pressure set point to the third servovalve, the method comprises the following supplementary steps:

if the value of the first pressure set point is greater than or equal to the first high threshold, and if the value of the second pressure set point is less than the second high threshold:

setting the value of the first pressure set point to the first high threshold;

setting the value of the third pressure set point to a value equal to:

$$Cp3=|2*P1-Cp1|$$

where $Cp3$ is the value of the third pressure set point, $P1$ is the value of the first mean supply pressure, and $Cp1$ is the value of the first pressure set point; and setting the value of the second pressure set point to a value equal to:

$$Cp2=|2*P2-Cp3|$$

where $Cp2$ is the value of the second pressure set point, $P2$ is the value of the second mean supply pressure, and $Cp3$ is the value of the third pressure set point.

In accordance with a preferred embodiment, following the step of defining a first pressure set point, a second pressure set point and a third pressure set point and before the step of applying the first pressure set point to the first servovalve, the second pressure set point to the second servovalve and the third pressure set point to the third servovalve, the method comprises the following supplementary steps:

comparing the value of the first pressure set point with a first low threshold;

comparing the value of the second pressure set point with a second low threshold;

if the value of the first pressure set point is less than or equal to the first low threshold, and if the value of the second pressure set point is less than or equal to the second low threshold:

setting the value of the first pressure set point to the first low threshold;

setting the value of the second pressure set point to the second low threshold; and setting the value of the third pressure set point to a third low threshold.

Also advantageously, following the step of defining a first pressure set point, a second pressure set point and a third pressure set point and before the step of applying the first pressure set point to the first servovalve, the second pressure set point to the second servovalve and the third pressure set point to the third servovalve, the method comprises the following supplementary steps:

if the value of the first pressure set point is less than or equal to a first low threshold, and if the value of the second supply set point is greater than a second low threshold:

setting the value of the first pressure set point to the first low threshold;

setting the value of the third pressure set point to a value equal to:

$$Cp3=|2*P1-Cp1|$$

where $Cp3$ is the value of the third pressure set point, $P1$ is the value of the first mean supply pressure, and $Cp1$ is the value of the first pressure set point; and setting the value of the second pressure set point to a value equal to:

$$Cp2=|2*P2-Cp3|$$

where $Cp2$ is the value of the second pressure set point, $P2$ is the value of the second mean supply pressure, and $Cp3$ is the value of the third pressure set point.

Braking is more accurate if the method comprises the following supplementary steps:

measuring a third value representative of the first pressure;

defining a first command to be applied to the first servovalve as a function of the third value and of the first pressure set point with the aid of a third servocontrol loop;

measuring a fourth value representative of the second pressure;

defining a second command to be applied to the second servovalve as a function of the fourth value and of the second pressure set point with the aid of a fourth servocontrol loop;

measuring a fifth value representative of the third pressure;

defining a third command to be applied to the second servovalve as a function of the fifth value and of the third pressure set point with the aid of a fifth servocontrol loop.

The invention also concerns a hydraulic braking device comprising a first servovalve, a second servovalve, a third servovalve, a first brake of a first wheel comprising a first braking actuator and a second braking actuator, a second brake of a second wheel comprising a second braking actuator. The first servovalve is adapted to deliver a first pressure to the first actuator, the second servovalve is adapted to deliver a second pressure to the third actuator and the third servovalve is adapted to deliver a third pressure to the second actuator and to the fourth actuator.

The device also comprises a first braking torque sensor disposed on the first brake to supply a first measurement of a first braking torque applied by the first brake to the first wheel and a second braking torque sensor disposed on the second brake to supply a second measurement of a second braking torque applied by the second brake to the second wheel. The device comprises a control unit connected to the first servovalve, the second servovalve, the third servovalve, the first torque sensor and the second torque sensor. A braking control interface is adapted to deliver a braking torque instruction to the control unit. According to the invention the control unit is adapted to execute the method described hereinabove.

The braking device advantageously comprises a first pressure sensor disposed at a first outlet of the first servovalve to supply a first measurement of a first pressure of a fluid at the outlet of the first servovalve, a second pressure sensor disposed at a second outlet of the second servovalve to supply a second measurement of a second pressure of a fluid at the outlet of the second servovalve and a third pressure sensor disposed at a third outlet of the third servovalve to supply a third measurement of a third pressure of a fluid at the outlet of the third servovalve.

The invention also concerns an aircraft comprising a braking device of the above kind.

The invention as defined hereinabove makes it possible to envisage an evolution of existing braking systems so as to control and to limit the torque in order actively to reduce the forces that are exerted on the structure of the landing gear on braking. Indeed, the braking forces are one of the criteria for determining the dimensions of the structural parts of a landing gear equipped with braked wheels. The invention then enables a significant improvement in terms of the dimensions and the weight of the structural parts. The invention also enables more homogeneous braking from one wheel to the other (same torque, therefore same force generated by each brake), which has a number of advantages:

preventing one brake overheating relative to the others and reducing the time between two flights (improved dispatching);

better comfort for passengers and improved feedback sensations for the pilot;

improved estimation of the state of the runway, which enables improved performance of the antiskid system.

Other features and advantages of the invention will become apparent on reading the following description of particular nonlimiting embodiments of the invention.

BRIEF DESCRIPTION OF THE DRAWINGS

Reference will be made to the appended figures, in which.

DETAILED DESCRIPTION OF THE INVENTION

Figure 1:
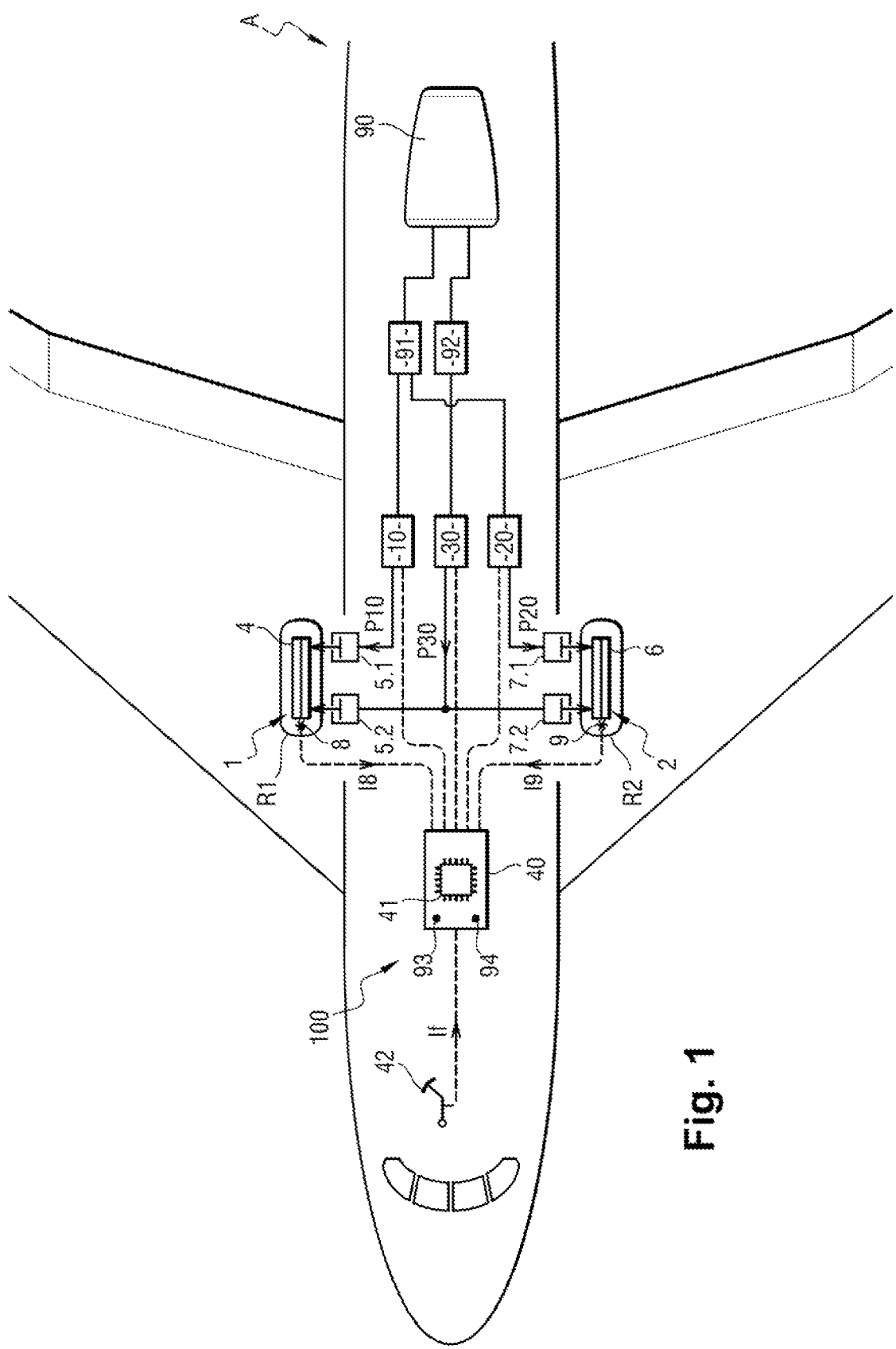
FIG. 1 is a diagrammatic representation of an aircraft provided with a device according to a first embodiment of the invention.

Referring to FIG. 1, the hydraulic braking device according to the invention, generally designated 1, is mounted in an aircraft A comprising a landing gear that includes a first wheel R1 and a second wheel R2. The aircraft A further comprises a turbine 90 connected to one of the engines of the aircraft A.

The device 100 comprises a first servovalve 10, a second servovalve 20 and a third servovalve 30 that are controlled electrically. The device 100 also comprises a first brake 1 of the first wheel R1 and a second brake 2 of the second wheel R2. The first brake 1 comprises a first stack 4 of brake discs that a first brake actuator 5.1 comes to press on and a second brake actuator 5.2 in a manner known to the person skilled in the art. The second brake 2 comprises a second stack 6 of brake discs on which a third brake actuator 7.1 and a fourth brake actuator 7.2 come to press in a manner known to the person skilled in the art.

The turbine 90 drives a first hydraulic unit 91 and a second hydraulic unit 92. The first servovalve 10 is supplied by the first hydraulic unit 91 and has an outlet connected to the first actuator 5.1 to deliver to it a fluid at a first pressure P10. The second servovalve 20 is supplied by the first hydraulic unit 91 and has an outlet connected to the third actuator 7.1 to deliver to it a fluid at a second pressure P20. The third servovalve 30 is supplied by the second hydraulic unit 92 and has outlets respectively connected to the second actuator 5.2 and to the fourth actuator 7.2 to deliver to them a fluid at a third pressure P30.

The device 100 also comprises a first braking torque sensor disposed on the first brake 1 to supply a first measurement (here a first current 18) representative of a first braking torque C1 applied by the first brake 1 to the first wheel R1. A second braking torque sensor 9 is disposed on the second brake 2 to supply a second measurement (here a second current 19) of a second braking torque C2 applied by the second brake 2 to the second wheel R2.

A control unit 40, comprising in a manner known in itself a microprocessor 41, is connected to the first servovalve 10, to the second servovalve 20, to the third servovalve 30, to the first sensor 8 and to the second sensor 9.

The device 100 also comprises a brake pedal 42 that can be actuated by a pilot of the aircraft A and that delivers a braking torque instruction If to the control unit 40.

Figure 2:
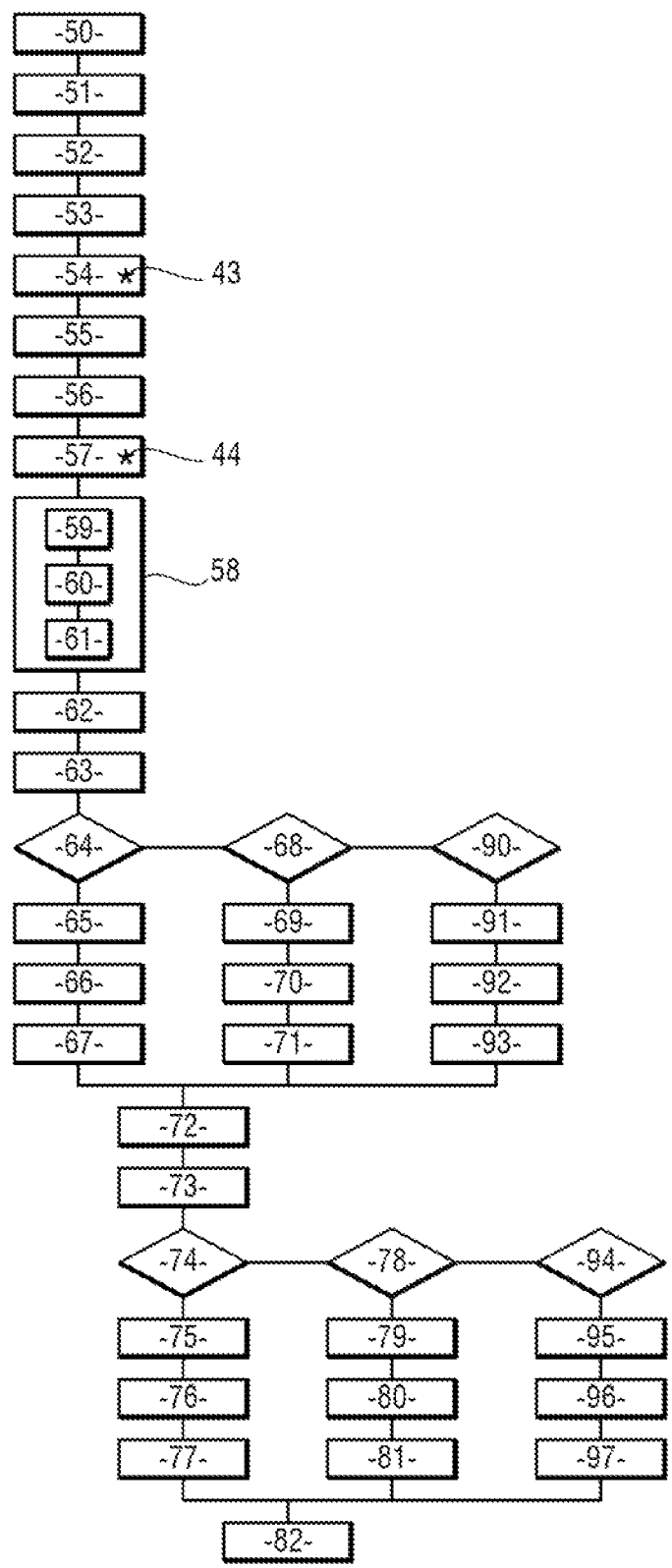
FIG. 2 is a flowchart detailing the steps of the first embodiment of the method of the invention.

The steps of the method of controlling the device 100 executed by the control unit 40 will be described with reference to FIG. 2.

In a step 50, the pilot of the aircraft A acts on the brake pedal 42 and the control unit 40 receives a braking torque instruction If corresponding to the depression of the brake pedal 42. In a second step 51, the control unit 40, on the basis of the braking torque instruction If, sets a first braking torque set point Cf1 for the first brake 1 and a second braking torque set point Cf2 for the second brake 2. For illustrative purposes, the first braking torque set point Cf1 and the second braking torque set point Cf2 are here both equal to 3500 decaNewton.metre.

In a step 52, the control unit 40 measures the first current 18 supplied by the first torque sensor 8 and converts that first current 18 into a first applied braking torque value Clapp applied by the first brake 1 to the first wheel R1. In a step 53, the control unit 40 then determines a first torque error $\varepsilon_1$ that exist between the first braking set point Cf1 and the first applied braking torque C1app. In a step 54, on the basis of the calculated torque error $\varepsilon_1$ and using a characteristic linking the value of the first applied braking torque C1app and the first mean supply pressure P1 of the first brake 1, the unit 40 defines a first mean supply pressure P1 to be applied to the first brake 1 to obtain a first applied braking torque C1app equal to the first torque set point Cf1 with the aid of a first servocontrol loop 43 known in itself. Here the first servocontrol loop 93 comprises a PID regulator. Here this first mean supply pressure P1 is equal to 100 000 hectopascals. The mean supply pressure is determined in a manner known in itself to the person skilled in the art. The numerical values are given by way of illustration only.

In a step 55, the control unit measures the second current 19 supplied by the second torque sensor 9, converts that second current 19 into a second applied braking torque value C2app applied by the second brake 2 to the second wheel R2. In a step 56, the control unit 40 then determines a second torque error $\varepsilon_2$ that exists between the second braking set point Cf2 and the second applied braking torque C2app. In a step 57, on the basis of the second calculated torque error $\varepsilon_2$ and using a characteristic linking the value of the second applied braking torque C2app and the second mean supply pressure P2 of the second brake 2, the unit 40 defines a second mean supply pressure P2 to be applied to the second brake 2 to obtain a second applied braking torque C2app equal to the second torque set point Cf2 with the aid of a second servocontrol loop 94 known in itself. Here the second servocontrol loop 44 comprises a PID regulator. Here this second mean supply pressure P2 is equal to 150 000 hectopascals.

In a step 58, the control unit 40 defines—on the basis of the first mean supply pressure P1 and the second mean supply pressure P2—a first pressure set point Cp1, a second pressure set point Cp2 and a third pressure set point Cp3.

The step 58 comprises a plurality of operations. In accordance with a first embodiment, during a first operation 59 the control unit 40 sets the value of the third pressure set point Cp3 to a value equal to the arithmetic mean of the first mean supply pressure P1 and the second mean supply pressure P2, that is to say 125 000 hectopascals.

In a second operation 60, the control unit 40 sets the value of the first pressure set point Cp1 to a value equal to:

$$Cp1=|2*P1-Cp3|$$

where Cp1 is the value of the first pressure set point, P1 is the value of the first mean supply pressure and Cp3 is the value of the third pressure set point.

The first pressure set point Cp1 is therefore equal to 75 000 hectopascals.

In a third operation 61, the control unit 40 sets the value of the second pressure set point Cp2 to a value equal to:

$$Cp2=|2*P2-Cp3|$$

where Cp2 is the value of the second pressure set point, P2 is the value of the second mean supply pressure and Cp3 is the value of the third pressure set point.

The second pressure set point Cp2 is therefore equal to 175 000 hectopascals.

In a step 62, the control unit 40 compares the value of the first pressure set point Cp1 with a first high threshold Pmax10—here equal to 200 000 hectopascals—that corresponds to the maximum first output pressure that the first servovalve 10 is able to deliver.

In a step 63, the control unit 40 compares the value of the second pressure set point Cp2 with a second high threshold Pmax20—here equal to 200 000 hectopascals—that corresponds to the second maximum output pressure that the second servovalve 20 is able to deliver. The control unit 40 then applies the following conditional steps.

In a step 64, if the value of the first pressure set point Cp1 is greater than or equal to the first high threshold Pmax10, and if the value of the second pressure set point Cp2 is greater than or equal to the second high threshold Pmax20, the control unit 40 carries out the following operations:

setting the value of the first pressure set point Cp1 to the value of the first high threshold Pmax10 (operation 65);

setting the value of the second pressure set point Cp2 to the value of the second high threshold Pmax20 (operation 66); and setting the value of the third pressure set point Cp3 to a third high threshold Pmax30 that corresponds to the third maximum output pressure that the third servovalve 30 is able to deliver (operation 67).

In a step 68, if the value of the first pressure set point Cp1 is greater than or equal to the first high threshold Pmax10 and if the value of the second pressure set point Cp2 is less than the second high threshold Pmax20, the control unit 40 carries out the following operations:

setting the value of the first pressure set point Cp1 to the first high threshold Pmax10 (operation 69);

setting the value of the third pressure set point Cp3 to a value equal to:

$$Cp3=|2*P1-Cp1|$$

where Cp3 is the value of the third pressure set point, P1 is the value of the first mean supply pressure, and Cp1 is the value of the first pressure set point (operation 70); and setting the value of the second pressure set point Cp2 to a value equal to:

$$Cp2=|2*P2-Cp3|$$

where Cp2 is the value of the second pressure set point, P2 is the value of the second mean supply pressure, and Cp3 is the value of the third pressure set point (operation 71). In a step 90, if the value of the first pressure set point Cp1 is less than the first high threshold Pmax10, and if the value of the second pressure set point Cp2 is greater than or equal to the second high threshold Pmax20, the control unit 40 carries out the following operations:

setting the value of the second pressure set point Cp2 to the second high threshold Pmax20 (operation 91);

setting the value of the third pressure set point Cp3 to a value equal to:

$$Cp3=|2*P2-Cp2|$$

where Cp3 is the value of the third pressure set point, P2 is the value of the second mean supply pressure, and Cp2 is the value of the second pressure set point (operation 92); and setting the value of the first pressure set point Cp1 to a value equal to:

$$Cp1=|2*P1-Cp3|$$

where Cp1 is the value of the first pressure set point, P1 is the value of the first mean supply pressure, and Cp3 is the value of the third pressure set point (operation 93).

In a step 72, the control unit 40 compares the value of the first pressure set point Cp1 with a first low threshold Pmin10—here equal to 0 hectopascal—that corresponds to the first minimum output pressure that the first servovalve 10 is able to deliver.

In a step 73, the control unit 40 compares the value of the second pressure set point Cp2 with a second low threshold Pmin20—here equal to 0 hectopascal—that corresponds to the second minimum output pressure that the second servovalve 20 is able to deliver.

In a step 74, if the value of the first pressure set point Cp1 is less than or equal to the first low threshold Pmin10, and if the value of the second pressure set point Cp2 is less than or equal to the second low threshold Pmin20, the control unit 40 carries out the following operations:

setting the value of the first pressure set point Cp1 to the first low threshold Pmin10 (operation 75);

setting the value of the second pressure set point Cp2 to the second low threshold Pmin20 (operation 76); and setting the value of the third pressure set point Cp3 to a third low threshold Pmin30 that corresponds to the third minimum output pressure that the third servovalve 30 is able to deliver (operation 77).

In a step 78, if the value of the first pressure set point Cp1 is less than or equal to the first low threshold Pmin10, and if the value of the second pressure set point Cp2 is greater than a second low threshold Pmin20, the control unit 40 carries out the following operations:

setting the value of the first pressure set point Cp1 to the first low threshold Pmin10 (operation 79);

setting the value of the third pressure set point Cp3 to a value equal to:

$$Cp3=|2*P1-Cp1|$$

where Cp3 is the value of the third pressure set point, P1 is the value of the first mean supply pressure, and Cp1 is the value of the first pressure set point (operation 80); and setting the value of the second pressure set point Cp2 to a value equal to:

$$Cp2=|2*P2-Cp3|$$

where Cp2 is the value of the second pressure set point, P2 is the value of the second mean supply pressure, and Cp3 is the value of the third pressure set point (operation 81).

In a step 94, if the value of the first pressure set point Cp1 is greater than the third low threshold Pmin10, and if the value of the second pressure set point Cp2 is less than or equal to the second low threshold Pmin20, the control unit 40 carries out the following operations:

setting the value of the second pressure set point Cp2 to the second low threshold Pmin20 (operation 95);

setting the value of the third pressure set point Cp3 to a value equal to:

$$Cp3=|2*P2-Cp2|$$

where Cp3 is the value of the third pressure set point, P2 is the value of the second mean supply pressure, and Cp2 is the value of the second pressure set point; and setting the value of the first pressure set point Cp1 to a value equal to:

$$Cp1=|2*P1-Cp3|$$

where Cp1 is the value of the first pressure set point, P1 is the value of the first mean supply pressure, and Cp3 is the value of the third pressure set point (operation 97).

In a step 82, the control unit 40 applies the first pressure set point Cp1 to the first servovalve 10, the second pressure set point Cp2 to the second servovalve 20 and the third pressure set point Cp3 to the third servovalve 30.

Elements identical or analogous to those described above will bear a reference number identical to the latter in the following description of the second and third embodiments of the invention and of a fourth and a fifth embodiment of the invention.

Figure 3:
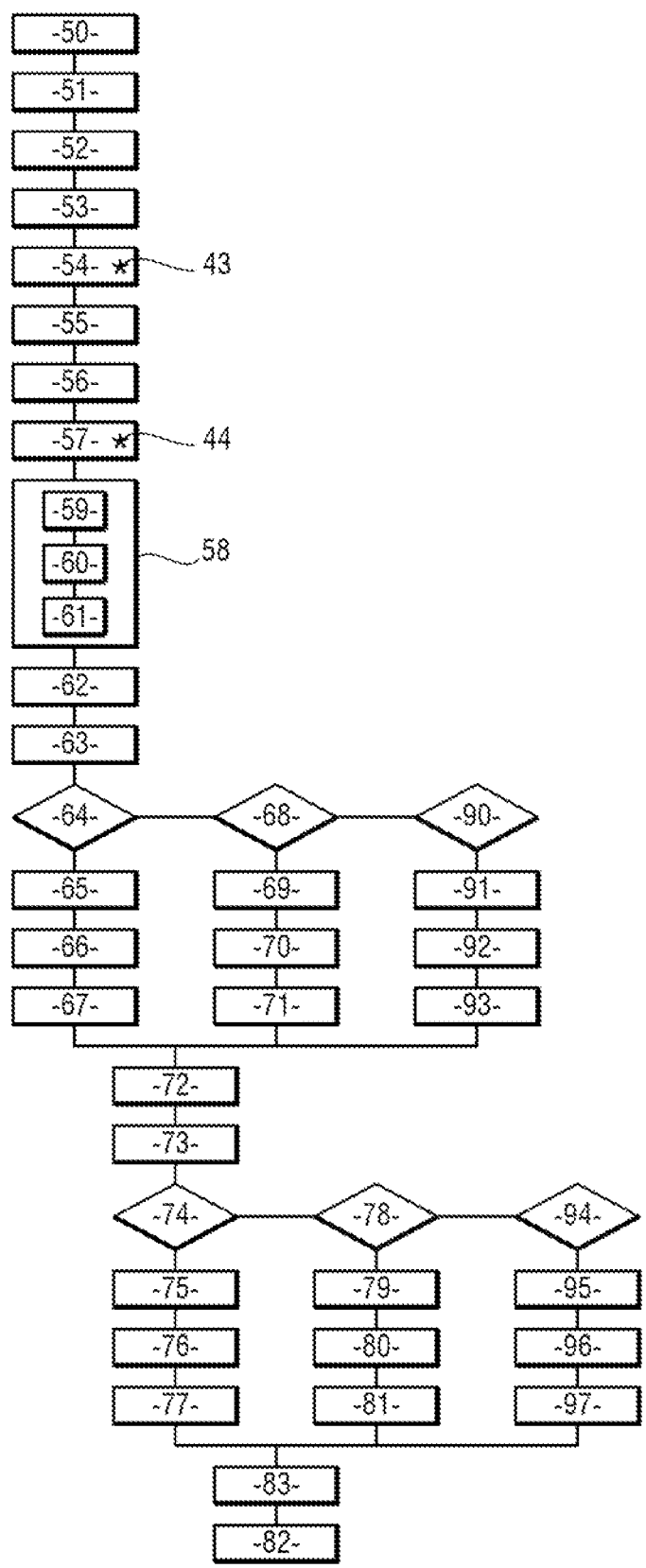
FIG. 3 is a flowchart detailing the steps of a second embodiment of the method of the invention.

Referring to FIG. 3, in accordance with a second embodiment the control unit 40 monitors the evolution of the first pressure set point Cp1, the second pressure set point Cp2 and the third pressure set point Cp3 and, in a step 83 situated between the steps 73/77/97 and the step 82, limits the rate of increase of the first pressure set point Cp1, of the second pressure set point Cp2 and of the third pressure set point Cp3 in such a manner that the rate of increase of the pressure set points remains below 100 000 hectopascals per second.

Figure 4:
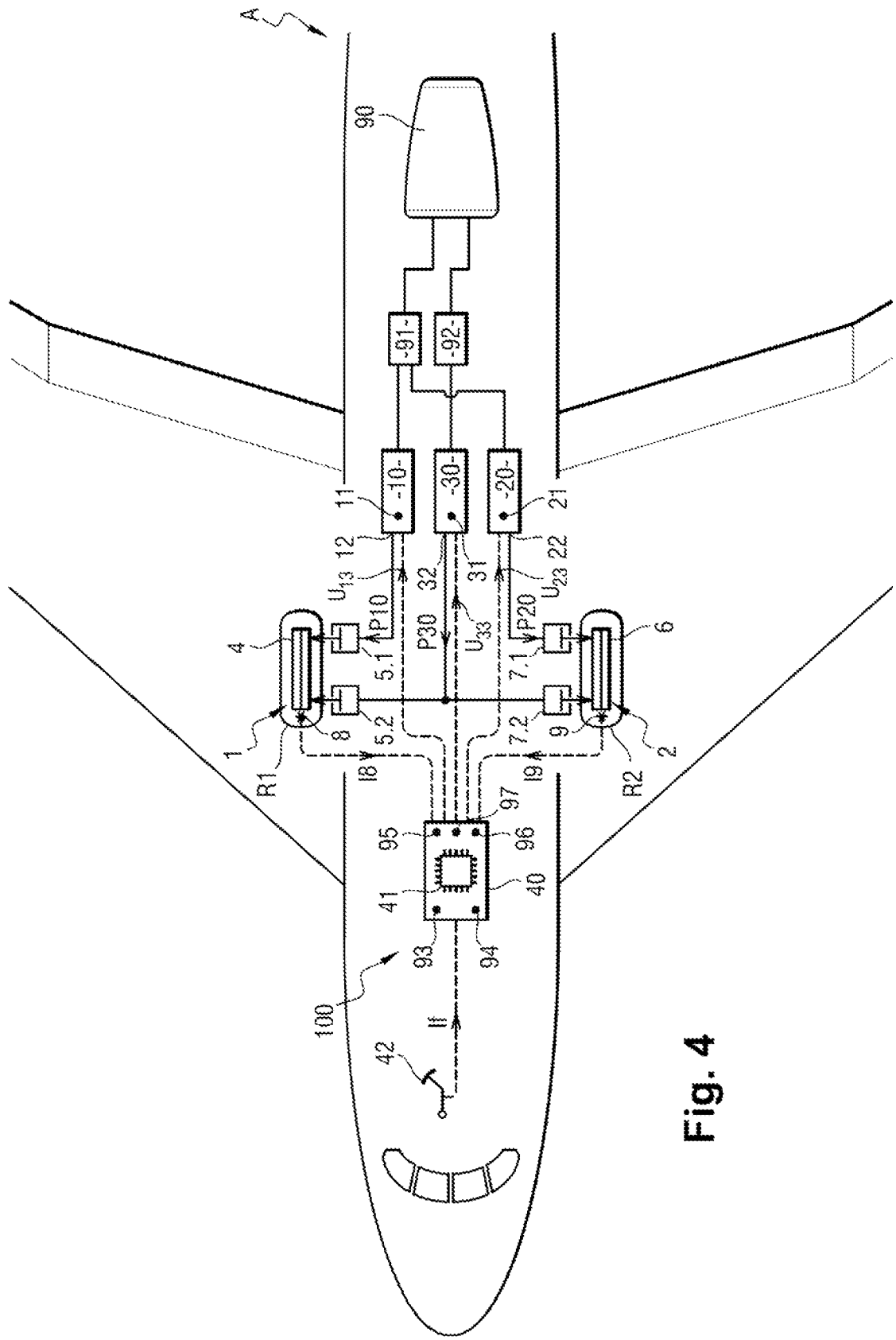
FIG. 4 is a diagrammatic representation of an aircraft provided with a device according to a second embodiment of the invention.
Figure 5:
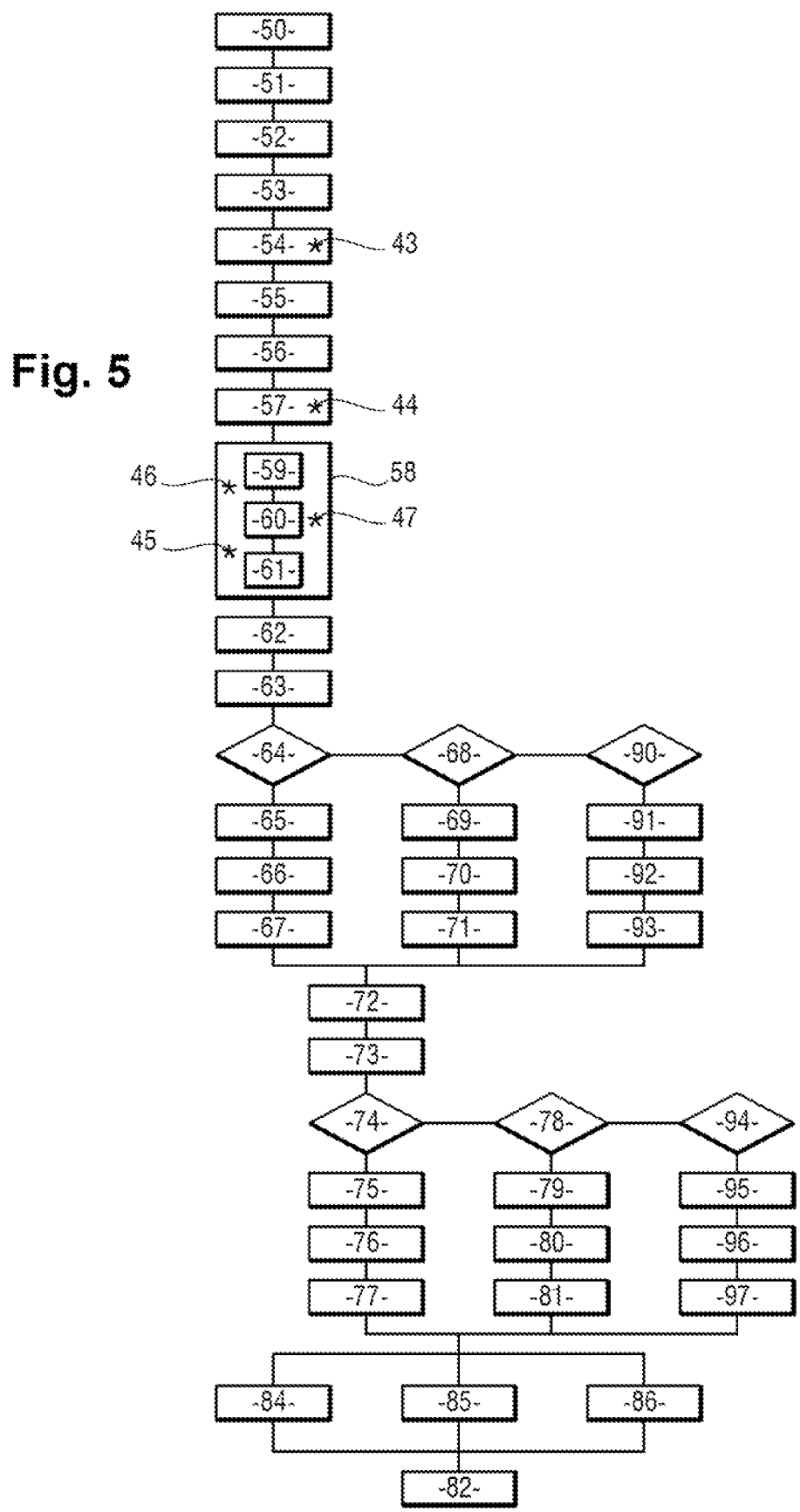
FIG. 5 is a flowchart detailing the steps of a third embodiment of the method of the invention.

Referring to FIGS. 4 and 5, in accordance with a third embodiment the device 100 also comprises a first pressure sensor 11 disposed at the outlet 12 of the first servovalve 10 to supply a first measurement of the first pressure P10 at the outlet of the first servovalve 10. The device 100 also comprises a second pressure sensor 21 disposed at the outlet 22 of the second servovalve 20 to supply a second measurement of the second pressure P20 at the outlet of the second servovalve 20. Finally, the device 100 also comprises a third pressure sensor 31 disposed at the outlet 32 of the third servovalve 30 to supply a third measurement of the third pressure P30 at the outlet of the third servovalve 30.

In a step 84 situated after the steps 77/81 and before the step 82, the control unit 40 measures a third current In supplied by the first pressure sensor 11, converts that third current In into a first pressure value P10 and defines a value of a first command—here a first voltage U13—to be applied to the first servovalve 10 as a function of the value of the third current In and of the first pressure set point Cp1 with the aid of a third servocontrol loop known in itself. Here the third servocontrol loop comprises a PID regulator.

In a step 85 situated after the steps 77/81 and before the step 82, the control unit 40 measures a fourth current I21 supplied by the second pressure sensor 21, converts that fourth current I21 into a second pressure value P20 and defines a value of a second command—here a second voltage U23—to be applied to the second servovalve 20 as a function of the fourth current I21 and of the second pressure set point Cp2 with the aid of a fourth servocontrol loop known in itself. Here the fourth servocontrol loop comprises a PID regulator.

In a step 86 situated after the steps 77/81 and before the step 82, the control unit 40 measures a fifth current I31 supplied by the third pressure sensor 31, converts that fifth current I31 into a third pressure value P30 and defines a value of a third command—here a third voltage U23—to be applied to the second servovalve 20 as a function of the fifth current value I31 and of the third pressure set point Cp3 with the aid of a fifth servocontrol loop 47 known in itself. Here the fifth servocontrol loop 47 comprises a PID regulator.

In accordance with a fourth embodiment, the operation 55 of setting the value of the third pressure set point Cp3 is carried out by setting the third pressure set point Cp3 to a value corresponding to the lower of the first supply pressure P1 and the second supply pressure P2.

In accordance with a fifth embodiment, the operation 55 of setting the value of the third pressure set point Cp3 is carried out by setting the third pressure set point Cp3 to a value corresponding to the higher of the first supply pressure P1 and the second supply pressure P2.

Obviously, the invention is not limited to the embodiments described and encompasses any variant falling within the scope of the invention as defined by the claims.

In particular, although here the third pressure set point is set as an arithmetic mean of the first and second supply pressures or as corresponding to the higher or the lower of the first and second supply pressures, the invention also applies to a method in which the third supply set point is set according to one and then the other of the criteria. For example, the third pressure set point may be set as corresponding to the mean of the supply pressures and then, during the same cycle of use, set at one of the extrema of the first and second supply pressures as a function of the value of the latter and/or of their proximity to one of the permissible extrema (minimum or maximum) of the first and second pressures;

although here the device is supplied by separate hydraulic units driven by a turbine, the invention also applies to other means of driving the hydraulic units such as for example a combustion engine or an electric motor;

although here the device is powered by two distinct hydraulic units, the invention also applies to a device supplied by a single hydraulic unit or by more than two hydraulic units, for example one hydraulic unit per servovalve;

although here the braking torque sensors supply a current representative of the braking torque applied by the brake to the wheel, the invention also applies to other types of sensors supplying another type of value for a parameter representative of a braking torque such as for example a voltage, a resistance, an inductance, a complex impedance, a capacitance;

although here the device comprises a brake pedal, the invention also applies to other types of control interface such as for example a control joystick or an automatic braking regulator device;

although here the braking torque set points are equal, the invention also applies to other braking torque set point values such as for example different values;

although here the high threshold corresponds to the maximum pressure that the servovalve is able to deliver, the invention also applies to other high threshold values such as for example the maximum pressure that the servovalve is able to deliver weighted by a safety coefficient or a predefined maximum value;

although here the low threshold corresponds to the minimum pressure that the servovalve is able to deliver, the invention also applies to other low threshold values such as for example the minimum pressure that the servovalve is able to deliver weighted by a safety coefficient or a predefined minimum value;

although here the servocontrol loop comprises a PID regulator, the invention also applies to other types of servocontrol loop such as for example a servocontrol loop not provided with a regulator or provided with a simple proportional and/or integral and/or derivative regulator;

although here the rate of increase of the pressure set point is monitored and limited for all the pressure set points, the invention also applies to limitation of only one or two pressure set points or to an absence of limitation;

although here the rate of increase of the pressure set point is limited to 100 000 hectopascals per second, the invention also applies to other maximum pressure set point rate of increase values such as for example a value less than or greater than 100 000 hectopascals per second;

although here the control unit converts the currents from the pressure sensors into braking torques, the invention also applies to other types of processing of the parameters representative of the braking pressure or of the braking torque such as for example processing with no conversion that manages the electrical magnitudes directly;

although here the device has been described in connection with braking two wheels, the invention also applies to braking a number of wheels greater than two;

although here the device has been described in relation to a brake comprising two braking actuators, the invention also applies to other types of brake such as for example a brake comprising more than two braking actuators;

although here the servovalves are controlled with the aid of an electric voltage, the invention also applies to other types of first, second and third command such as for example a current or a hydraulic or pneumatic pressure;

although here the mean pressures are set with the aid of a characteristic linking the value of the braking torque applied to a wheel and the mean pressure, the invention also applies to other means of setting a mean pressure such as for example a mathematical equation or a linear or non-linear interpolation produced with the aid of measurement points.

The invention claimed is:

1. A method of controlling a hydraulic braking device that comprises:
   a first servovalve, a second servovalve, a third servovalve;
   a first brake of a first wheel comprising a first braking actuator and a second braking actuator that apply a first braking torque to the first wheel; and
   a second brake of a second wheel comprising a third braking actuator and a fourth braking actuator that apply a second braking torque to the second wheel;
   the first servovalve being adapted to deliver a first pressure to the first braking actuator, the second servovalve being adapted to deliver a second pressure to the third braking actuator, the third servovalve being adapted to deliver a third pressure to the second braking actuator and to the fourth braking actuator,
   the method comprising:
   receiving a braking torque instruction;
   based on the received braking torque instruction, setting a first braking torque set point for the first brake and a second braking torque set point for the second brake;
   measuring a first value of a first parameter representative of the first braking torque;
   defining a first mean supply pressure to be applied to the first brake as a function of the first value of the first parameter and of the first braking torque set point with the aid of a first servocontrol loop;
   measuring a second value of a second parameter representative of the second braking torque;
   defining a second mean supply pressure to be applied to the second brake as a function of the second value of the second parameter and of the second braking torque set point with the aid of a second servocontrol loop;
   based on the first mean supply pressure and the second mean supply pressure, defining a first pressure set point, a second pressure set point and a third pressure set point; and
   applying the first pressure set point to the first servovalve, the second pressure set point to the second servovalve and the third pressure set point to the third servovalve.

2. The method according to claim 1, further comprising limiting a rate of increase of at least one of the first pressure set point, the second pressure set point, or the third pressure set point.

3. The method according to claim 1, wherein defining the first pressure set point, the second pressure set point and the third pressure set point comprises:
   defining a value of the first mean supply pressure of the first brake;
   defining a value of the second mean supply pressure of the first brake;
   setting the value of the third pressure set point;

setting the value of the first pressure set point to a value equal to:

$$Cp1=|2*P1-Cp3|$$

where Cp1 is the value of the first pressure set point, P1 is the value of the first mean supply pressure and Cp3 is the value of the third pressure set point; and setting the value of the second pressure set point to a value equal to:

$$Cp2=|2*P2-Cp3|$$

where Cp2 is the value of the second pressure set point, P2 is the value of the second mean supply pressure and Cp3 is the value of the third pressure set point.

4. The method according to claim 3, wherein the value of the third pressure set point is set to a value corresponding to an arithmetic mean of the first mean supply pressure and the second mean supply pressure.

5. The method according to claim 3, wherein the value of the third pressure set point is set to a value corresponding to the lower of the first mean supply pressure and the second mean supply pressure.

6. The method according to claim 3, wherein the value of the third pressure set point is set to the higher of the first mean supply pressure and the second mean supply pressure.

7. The method according to claim 1, wherein, after defining the first pressure set point, the second pressure set point and the third pressure set point and before applying the first pressure set point to the first servovalve, the second pressure set point to the second servovalve and the third pressure set point to the third servovalve, the method further comprises:
   comparing the value of the first pressure set point to a first high threshold;
   comparing the value of the second pressure set point to a second high threshold; and
   if the value of the first pressure set point is greater than or equal to the first high threshold, and if the value of the second pressure set point is greater than or equal to the second high threshold:
   setting the value of the first pressure set point to the first high threshold;
   setting the value of the second pressure set point to the second high threshold; and
   setting the value of the third pressure set point to a third high threshold.

8. The method according to claim 1, wherein, after defining the first pressure set point, the second pressure set point and the third pressure set point and before applying the first pressure set point to the first servovalve, the second pressure set point to the second servovalve and the third pressure set point to the third servovalve, the method further comprises:
   if the value of the first pressure set point is greater than or equal to a first high threshold, and if the value of the second pressure set point is less than a second high threshold:
   setting the value of the first pressure set point to the first high threshold;
   setting the value of the third pressure set point to a value equal to:

$$Cp3=|2*P1-Cp1|$$

where Cp3 is the value of the third pressure set point, P1 is the value of the first mean supply pressure, and Cp1 is the value of the first pressure set point; and setting the value of the second pressure set point to a value equal to:

$$Cp2=|2*P2-Cp3|$$

where Cp2 is the value of the second pressure set point, P2 is the value of the second mean supply pressure, and Cp3 is the value of the third pressure set point.

9. The method according to claim 1, wherein, after defining the first pressure set point, the second pressure set point and the third pressure set point and before applying the first pressure set point to the first servovalve, the second pressure set point to the second servovalve and the third pressure set point to the third servovalve, the method further comprises: —comparing the value of the first pressure set point with a first low threshold; —comparing the value of the second pressure set point with a second low threshold; and if the value of the first pressure setpoint is less than or equal to the first low threshold, and if the value of the second pressure set point is less than or equal to the second low threshold: —setting the value of the first pressure set point to the first low threshold; —setting the value of the second pressure setpoint to the second low threshold; and —setting the value of the third pressure setpoint to a third low threshold.

10. The method according to claim 1, wherein, after defining the first pressure set point, the second pressure set point and the third pressure set point and before applying the first pressure set point to the first servovalve, the second pressure set point to the second servovalve and the third pressure set point to the third servovalve, the method further comprises:
    if the value of the first pressure set point is less than or equal to a first low threshold, and if the value of the second pressure set point is greater than a second low threshold:
    setting the value of the first pressure set point to the first low threshold;
    setting the value of the third pressure set point to a value equal to:

$$Cp3=|2*P1-Cp1|$$

where Cp3 is the value of the third pressure set point, P1 is the value of the first mean supply pressure, and Cp1 is the value of the first pressure set point; and setting the value of the second pressure set point to a value equal to:

$$Cp2=|2*P2-Cp3|$$

where Cp2 is the value of the second pressure set point, P2 is the value of the second mean supply pressure, and Cp3 is the value of the third pressure set point.

11. The method according to claim 1, further comprising:
    measuring a third value representative of the first pressure;
    defining a first command to be applied to the first servovalve as a function of the third value and of the first pressure set point with the aid of a third servocontrol loop;
    measuring a fourth value representative of the second pressure;
    defining a second command to be applied to the second servovalve as a function of the fourth value and of the second pressure set point with the aid of a fourth servocontrol loop;
    measuring a fifth value representative of the third pressure; and defining a third command to be applied to the second servovalve as a function of the fifth value and of the third pressure set point with the aid of a fifth servocontrol loop.

12. A braking device comprising:
a first servovalve, a second servovalve, a third servovalve;
a first brake of a first wheel, the first brake comprising a first braking actuator and a second braking actuator;
a second brake of a second wheel, the second brake comprising a third braking actuator and a fourth braking actuator;
the first servovalve being adapted to deliver a first pressure to the first braking actuator, the second servovalve being adapted to deliver a second pressure to the third braking actuator, the third servovalve being adapted to deliver a third pressure to the second braking actuator and to the fourth braking actuator;
wherein the braking device further comprises:
a first braking torque sensor disposed on the first brake to supply a first measurement of a first braking torque applied by the first brake to the first wheel;
a controller connected to the first servovalve, the second servovalve, the third servovalve, the first braking torque sensor and a second braking torque sensor; and
a braking control interface adapted to deliver a braking torque instruction to the controller;
wherein the controller is configured to:
receive the braking torque instruction;
based on the received braking torque instruction, set a first braking torque set point for the first brake and a second braking torque set point for the second brake;
measure a first value of a first parameter representative of the first braking torque;
define a first mean supply pressure to be applied to the first brake as a function of the first value of the first parameter and of the first braking torque set point with the aid of a first servocontrol loop;
measure a second value of a second parameter representative of a second braking torque;
define a second mean supply pressure to be applied to the second brake as a function of the second value of the second parameter and of the second braking torque set point with the aid of a second servocontrol loop;

based on the first mean supply pressure and the second mean supply pressure, define a first pressure set point, a second pressure set point and a third pressure set point; and
apply the first pressure set point to the first servovalve, the second pressure set point to the second servovalve and the third pressure set point to the third servovalve.

13. The braking device according to claim 12, further comprising
a first pressure sensor disposed at a first outlet of the first servovalve to supply a first measurement of a first pressure of a fluid at the first outlet of the first servovalve;
a second pressure sensor disposed at a second outlet of the second servovalve to supply a second measurement of a second pressure of a fluid at the second outlet of the second servovalve; and
a third pressure sensor disposed at a third outlet of the third servovalve to supply a third measurement of a third pressure of a fluid at the third outlet of the third servovalve;
wherein the controller is further configured to:
measure a third value representative of the first pressure of the fluid at the first outlet;
define a first command to be applied to the first servovalve as a function of the third value and of the first pressure set point with the aid of a third servocontrol loop;
measure a fourth value representative of the second pressure of the fluid at the second outlet;
define a second command to be applied to the second servovalve as a function of the fourth value and of the second pressure set point with the aid of a fourth servocontrol loop;
measure a fifth value representative of the third pressure of the fluid at the third outlet; and
define a third command to be applied to the second servovalve as a function of the fifth value and of the third pressure set point with the aid of a fifth servocontrol loop.

14. An Aircraft comprising the braking device according to claim 12.

* * * * *